June 3, 1930.　　　C. E. SCOTT　　　1,761,752
MOTOR MOUNTING
Filed Dec. 24, 1927
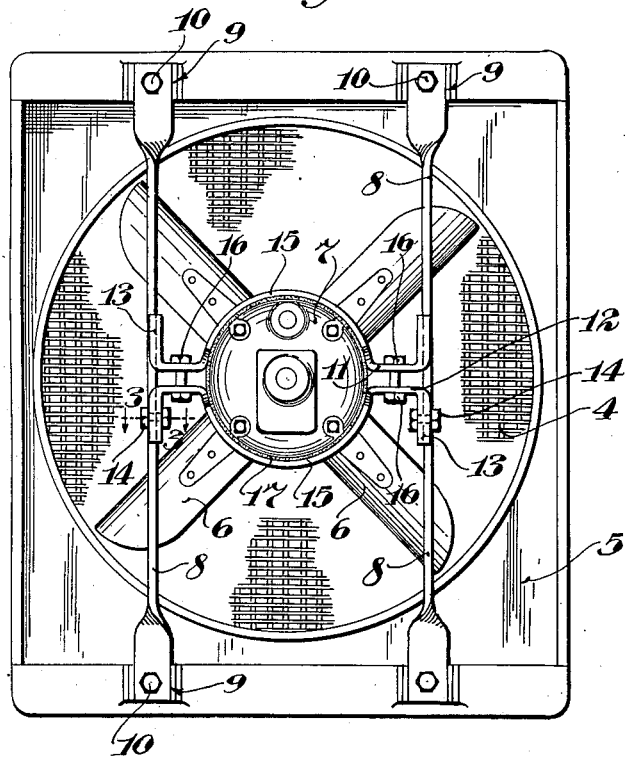
Inventor
Clifford E. Scott
By his Attorneys
Merchant and Kilgore Patented June 3, 1930

1,761,752

UNITED STATES PATENT OFFICE

CLIFFORD E. SCOTT, OF MINNEAPOLIS, MINNESOTA, ASSIGNOR TO McQUAY RADIATOR CORPORATION, OF MINNEAPOLIS, MINNESOTA, A CORPORATION OF DELAWARE

MOTOR MOUNTING

Application filed December 24, 1927. Serial No. 242,487.

My present invention has for its object the provision of a simple and highly efficient electric motor mounting intended for general use, but especially adapted for use in connection with a unit heater in a heating system, and to this end, generally stated, the invention consists of the novel devices and combinations of devices hereinafter described and defined in the claims.

In the accompanying drawings, which illustrate the invention, like characters indicate like parts throughout the several views.

Referring to the drawings:

Fig. 1 is a rear view of a unit heater in which the improved motor mounting is embodied;

Fig. 2 is a perspective view of the upper transverse bar; and

Fig. 3 is a detail view principally in section taken on the line 3—3 of Fig. 1, on an enlarged scale.

Of the parts of the unit heater illustrated, it is important to note the radiator 4, housing 5, fan 6, and electric motor 7 for operating said fan.

The improved motor mounting for the motor includes a support comprising a pair of laterally spaced upright flat bars 8, set edgewise perpendicular to the back of the housing 5. The end portions of the bars 8 are bent laterally into a plane parallel to the back of the housing 5, mounted in seats 9 in said housing at the top and bottom thereof and rigidly but detachably secured thereto by bolts 10.

Said motor mounting further includes a pair of upper and lower horizontal bars 11 and 12, respectively. These bars 11 and 12 are laterally spaced, extended transversely between the supporting bars 8 and have on their ends channel shoes 13 slidably mounted on the support bar 8. Nut-equipped bolts 14 rigidly but detachably connect the shoes 13 of the lower bar 12 to the support bars 8. The intermediate portions of the bars 11 and 12 are formed on a circle, the diameter of which is slightly greater than that of the motor 7 to form co-operating half seats 15 in which said motor is mounted. Nut-equipped bolts 16 connect the bars 11 and 12 outward of the half seats 15 and clamp said half seats onto the motor for rigidly holding the same. Obviously, the shoes 13 on the bar 11 guide said bar toward and from the bar 12 during its adjustment in respect thereto by means of the bolt 16. The shoes 13 securely hold the bars 11 and 12 interlocked with the support bars 8 against lateral movement.

A cushion strip 17 of cork or other suitable material is interposed between the motor 7 and half seats 15 to absorb the vibration of the motor, thus eliminating rattle and noise.

What I claim is:

1. A motor mounting comprising a pair of laterally spaced longitudinal bars applicable to a support, a pair of transverse bars between the longitudinal bars and having a motor seat, the transverse bars being directly mounted on the longitudinal bars, the ends of one of the transverse bars being free for movement longitudinally of the longitudinal bars, and adjustable devices connecting the two transverse bars.

2. A motor mounting comprising a pair of laterally spaced longitudinal bars applicable to a support, a pair of laterally spaced transverse bars between the longitudinal bars and having at their ends channel shoes into which the longitudinal bars extend, the shoes of one transverse bar being rigidly secured to the longitudinal bars and the shoes of the other transverse bar being free for sliding movement thereon, said transverse bars having a motor seat, and adjustable devices connecting the two transverse bars.

In testimony whereof I affix my signature.

CLIFFORD E. SCOTT.